(No Model.)  2 Sheets—Sheet 1.
W. A. HOEVELER.
SYSTEM OF PIPES FOR CONVEYING GAS, WATER, AND ELECTRICITY.

No. 332,149.  Patented Dec. 8, 1885.

(No Model.) 2 Sheets—Sheet 2.
W. A. HOEVELER.
SYSTEM OF PIPES FOR CONVEYING GAS, WATER, AND ELECTRICITY.
No. 332,149. Patented Dec. 8, 1885.

Witnesses
A. A. Moon,
N. N. Connolly

Inventor
William A. Hoeveler
by Connolly Bros
Attorneys

UNITED STATES PATENT OFFICE.

WILLIAM A. HOEVELER, OF SPRINGDALE, PENNSYLVANIA.

SYSTEM OF PIPES FOR CONVEYING GAS, WATER, AND ELECTRICITY.

SPECIFICATION forming part of Letters Patent No. 332,149, dated December 8, 1885.

Application filed September 12, 1885. Serial No. 176,940. (No model.)

*To all whom it may concern:*

Be it known that I, WILLIAM A. HOEVELER, a citizen of the United States, residing at Springdale, in the county of Allegheny and State of Pennsylvania, have invented certain new and useful Improvements in Systems of Pipes for Conveying Gas, Water, and Electricity; and I do hereby declare the following to be a full, clear, and exact description of the invention, reference being had to the accompanying drawings, which form part of this specification.

My invention has relation to systems for conducting gas, water, and electricity through the streets of towns and cities, and has for its object the provision of means whereby the conductors of gas, water, and electricity may be conveniently carried along the ways or streets and branches therefrom led off at points of consumption.

My invention has for its further object the provision of means for preventing the accumulation of any gas from the mains, and for avoiding the danger of any such gas leaking into the cellars or apartments of buildings along the line.

My invention has for its still further object the provision of means for safely and economically conveying electricity through the medium of cables and wires beneath the surface of the earth to points of consumption.

My invention consists in the novel construction, combination, and arrangement of parts, as hereinafter described and specifically claimed.

Figure 1:
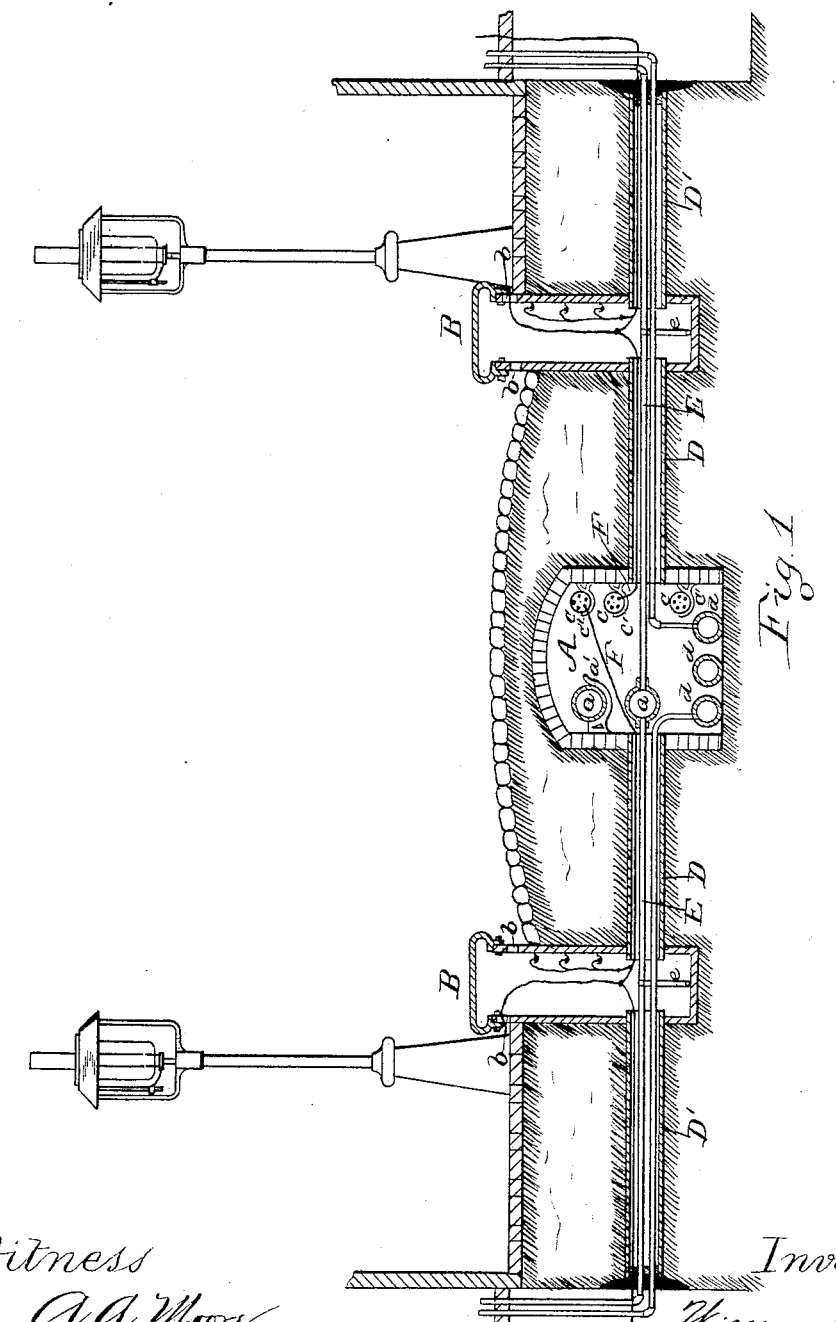
Figure 2:
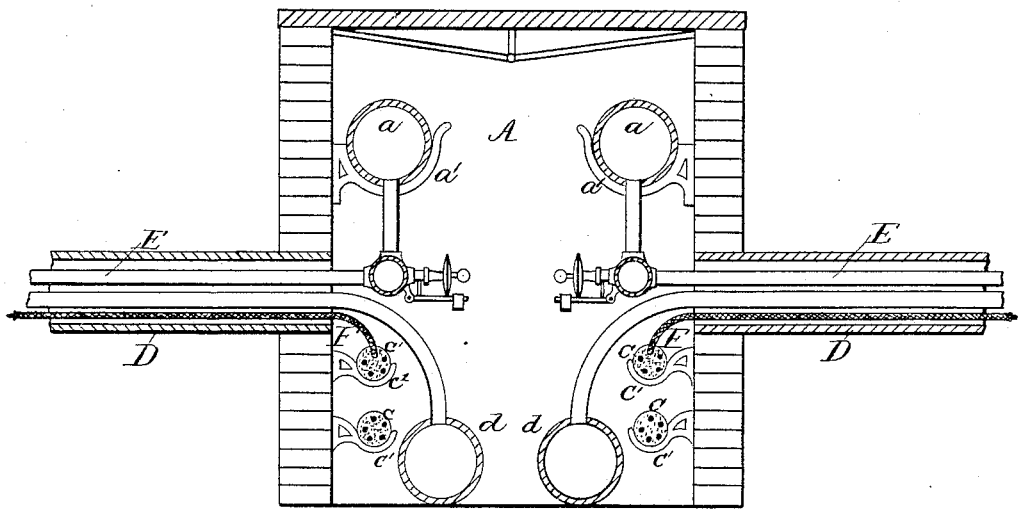

Referring to the accompanying drawings, illustrating my invention, Figure 1 is a vertical cross-section of the middle of a street with my improvements in position below the surface of the same; Fig. 2, an enlarged section of the main conduit shown in Fig. 1.

A designates the main conduit, consisting of an arched or covered passage, tunnel, or the like, composed of stone, brick, or other appropriate material, and provided at intervals with man-holes leading to the surface of the street and properly covered, so as to afford access to the interior of the conduit when desirable.

B B designate hollow iron curbs, which are placed along the sides of the pavement in place of the stone curbs ordinarily used. These curbs B B may be of any desirable shape in cross-section, and are provided with holes $b\ b$ beneath their tops and above the surface for the escape of any gas which may find its way to their interiors.

At one side of the conduit A, I arrange several rows of gas-mains, $a\ a\ a$, which are sustained upon brackets $a'\ a'\ a'$, and upon the opposite side of the conduit I arrange a number of insulated cables, $c\ c\ c$, containing one or more strands of wire for the conveyance of electric currents, said cables being held up on brackets $c'\ c'\ c'$, secured to the side of the conduit in any appropriate manner. Several water-mains, $d\ d\ d$, may also be placed in convenient manner within the conduit A, being either laid along the bottom of the same or supported upon brackets in similar manner to the gas-mains $a\ a$.

At any and all points on the line of the conduit where it is desired to carry off branches from any of the gas-pipes $a\ a$, or from the electric cables $c\ c\ c$, or from the water-mains $d\ d$, I place pipes D D, which open at one end into the conduit A, and at the other end open into the hollow curbs B B. Where the gas, water, or electricity is to be conveyed only as far as the curb, as where the gas is intended to light a street-lamp, or the electricity is intended to run to a fire-alarm box or to a street-lamp, or the water is intended to be conveyed to a street-washer or fire-plug, the pipes D D run no farther; but where the gas, water, or electricity is intended to be conveyed into buildings extensions D' D' of the pipes D D are laid, which extensions at their outer ends lead into the interior of the curbs B B, and their inner end reaches only to the walls of the cellar or vault of the buildings which are to be supplied with gas, water, or electricity, as the case may be. The outer ends of the pipes D' D' are open, but their inner ends are tightly sealed around the gas or water pipes or the electric wires running therethrough.

E E designate the branch pipes leading from the mains $a\ a$, and $e\ e\ e$ are branches connected to the branches E, and running along through the hollow curb B B. The branch pipes E pass through the pipes D D', and hence any leakage therefrom at any point between the conduit A and the inner ends of the safety-pipes D', as well as any gas which may escape into the conduit A from the mains $a\,a$, will invariably find its way into the hollow curbs B B, and escape therefrom into the air through the openings $b\,b$. The electric conductors, also, are conveyed to the desired points of consumption by precisely the same path as the gas-pipes, being led off from the cables $c\,c\,c$ at F, and through the pipes D' D' to the interior of the buildings. Wires are also laid longitudinally in the hollow curb alongside of the branch pipes $e\,e$, and water may also pursue the same course.

In order to allow of access to the interior of the curbs B B, the tops of the same may be made removable.

It will be observed that I have made careful provision for the escape into the open air of any gas which may leak or escape from either the mains $a\,a$ or any of the branches, and this provision is of great value where gas is to be conveyed under pressure, as in such cases, particularly where "natural gas" is to be conveyed, it has been found almost impossible to prevent leakage at times in the mains and branches. The manner of conveying the wires, too, is of great utility, as it renders it quite easy to take a branch from one of the several cables $c\,c\,c$ and lead it through the safety-pipes D D to the building which is to be supplied, or along the hollow curbstone to any other point of consumption.

I believe my herein-described system of conveying gas, water, and electricity possesses important advantages not found in any system now in use.

The gas-pipes and electric conductors, being placed in a covered way beneath the surface, are readily accessible without the necessity of tearing up the street or sidewalk, the serious disadvantages of overhead and exposed wires is dispensed with, and the conveyance of natural gas under pressure rendered absolutely safe. The same remarks apply to the conveyance of water-pipes, and repairs to the mains or branches of either the gas or water pipes or electric conductors are readily and easily made without tearing up the street or sidewalk.

Having fully described my invention, I claim—

1. In a system of mains for conveying gas and electricity, the combination, with a conduit, A, hollow curbs B B, arranged in proximity thereto, and safety-pipes D D, connecting the interior of said conduit with the interiors of the said hollow curbs, of gas-mains or a gas-main arranged in said conduit, branch pipes E E, leading from said mains through the pipes D D into the hollow curbs, branch pipes connected to the pipes E E and leading along through the curbs, and an electric conductor or conductors, also arranged in said conduits, and branches therefrom leading through the pipes D D and along through the curbs, all constructed and arranged substantially as described.

2. In a system of mains for conveying gas and electricity, the combination, with conduit A, hollow curbs B B, safety-pipes D D, leading from said conduit to said curbs and open at both ends, safety-pipes D' D', leading from the hollow curbs to the buildings to be supplied, of gas-mains arranged in the interior of the conduit, and branches therefrom leading through the pipes D D' to the point of consumption, the pipes D' being sealed around said branch pipes at or near the building-line, and opening into the hollow curb at the other end, substantially as and for the purpose described.

3. In a system of mains for conveying gas, water, and electricity, the combination, with a main conduit arranged in the street and containing properly-disposed gas and water mains and electric cables, hollow curbs at each side of said conduit having removable tops to permit of ready access to their interiors, safety-pipes connecting said conduit and hollow curbs and open at both ends, and safety-pipes connecting said hollow curbs with the buildings to be supplied, said last-named pipes being open at one end and sealed around the gas or water pipes or electric conductors at the other end, of branches from the gas and water mains and from the electric cable, said branches passing through the safety-pipes to the buildings to be supplied, and being provided with branches which traverse the hollow curbs in the direction of their lengths.

4. In a system of mains for conveying gas, water, and electricity underground, the combination, with a main conduit adapted to receive the gas and water mains and electric cables, of hollow curbs adapted to receive a branch or branches from each, and safety-pipes leading from the conduit to the hollow curbs, and from the latter to the buildings to be supplied, the system of conduit, hollow curbs, and safety-pipes communicating freely with one another, and escape-openings for the escape of gas being provided at intervals, all communication being shut off between the safety-pipes and the buildings to which they lead, substantially as described.

In testimony that I claim the foregoing I have hereunto set my hand this 10th day of September, 1885.

WILLIAM A. HOEVELER.

Witnesses:
 JOS. B. CONNOLLY,
 A. A. MOORE.